United States Patent [19]
Baker et al.

[11] Patent Number: 5,479,493
[45] Date of Patent: Dec. 26, 1995

[54] CALLING LINE IDENTIFICATION ADJUNCT FOR USE WITH A COMMUNICATION SYSTEM

[75] Inventors: Albert D. Baker, Lincroft; Joseph M. Bennett, Middletown; Richard Y. Hsia, Holmdel; David G. Kemp, II, Sea Bright; Thomas V. Kurien, Howell, all of N.J.

[73] Assignee: AT&T Corp., Murray Hill, N.J.

[21] Appl. No.: 886,573

[22] Filed: May 21, 1992

[51] Int. Cl.⁶ .................. H04M 15/00; H04M 15/06; H04M 3/00; H04M 3/42
[52] U.S. Cl. .................. 379/127; 379/142; 379/701; 379/245; 379/198; 379/246
[58] Field of Search .................. 379/142, 165, 379/196, 197, 198, 201, 127, 245, 246

[56] References Cited

U.S. PATENT DOCUMENTS

| | | | |
|---|---|---|---|
| 3,725,596 | 4/1973 | Maxon | 379/127 |
| 3,967,073 | 6/1976 | Anderson | 379/127 |
| 3,997,731 | 12/1976 | Wilmot | 379/201 |
| 4,191,860 | 3/1980 | Weber | 379/211 |
| 4,232,199 | 11/1980 | Boatwright | 379/201 |
| 4,560,837 | 12/1985 | Carson et al. | 379/212 |
| 4,582,956 | 4/1986 | Doughty | 379/142 |
| 4,696,028 | 9/1987 | Morganstein et al. | 379/88 |
| 4,757,267 | 7/1988 | Riskin | 379/201 |
| 4,763,353 | 8/1988 | Canale et al. | 379/67 |
| 4,785,408 | 11/1988 | Britton et al. | 379/201 |
| 4,879,743 | 11/1989 | Burke et al. | 379/142 |
| 4,899,358 | 2/1990 | Blakley | 379/142 |
| 5,027,384 | 6/1991 | Morganstein | 379/211 |
| 5,029,196 | 7/1991 | Morganstein | 379/142 |
| 5,034,975 | 7/1991 | Grimes | 379/142 |
| 5,036,535 | 7/1991 | Gechter et al. | 379/210 |
| 5,054,055 | 10/1991 | Hanle | 379/142 |
| 5,109,405 | 4/1992 | Morganstein | 379/142 |
| 5,117,452 | 5/1992 | Callele | 379/142 |
| 5,136,636 | 8/1992 | Wegrzynowicz | 379/201 |
| 5,222,124 | 6/1993 | Castaneda | 379/67 |
| 5,228,080 | 7/1993 | Nutter | 379/142 |
| 5,233,648 | 8/1993 | Nakamura | 379/233 |
| 5,265,145 | 11/1993 | Lim | 379/142 |

Primary Examiner—Stephen Chin
Assistant Examiner—Paul Loomis
Attorney, Agent, or Firm—John A. Caccuro

[57] ABSTRACT

An adjunct unit provides Incoming Caller Line Identification (ICLID) capability for a communication system. The adjunct unit interposed between the control unit and station sets of a communication system obtains ICLID from ringing central office lines and monitors signalling between the control unit and station sets to determine which stations are to receive the ICLID information. Using prestored database information the ICLID information can be used to obtain the calling party name for output to the station sets. The adjunct unit also outputs ICLID information to an application processor which stores calling records for the system.

20 Claims, 5 Drawing Sheets

FIG. 8

LINE TRANSLATION TABLE 800

| STATION 107 | | |
|---|---|---|
| LINE APPEARANCE | CO LINE | RESTRICTION |
| LINE 1 | 1 | Y |
| LINE 2 | 2 | N |
| LINE 3 | 3 | N |
| | | |
| | | |

| STATION 108 | | |
|---|---|---|
| LINE APPEARANCE | CO LINE | RESTRICTION |
| LINE 1 | 2 | Y |
| LINE 2 | 5 | N |
| | | |

| STATION 109 | | |
|---|---|---|
| LINE APPEARANCE | CO LINE | RESTRICTION |
| LINE 1 | 2 | N |
| LINE 2 | 6 | N |

FIG. 10

ICLID/NAME TABLE 1000

| ICLID | NAME |
|---|---|
| 9573527 | TOM KURIEN |
| 9573222 | DAVE KEMP |
| 9576241 | JOE BENNETT |
| 9572606 | RICHARD HSIA |
| 9573146 | AL BAKER |
| ⋮ | ⋮ |

5,479,493

CALLING LINE IDENTIFICATION ADJUNCT FOR USE WITH A COMMUNICATION SYSTEM

TECHNICAL FIELD

This invention relates to telephone communication systems and, more particularly, to an adjunct for use with a telephone communication system for enabling the utilization of information received during a silent interval between ringing signals.

1. Background of the Invention

The utilization of information received during a silent interval between ringing signals, including the Incoming Call Line Identification (ICLID) number, is now being incorporated into new private or subscriber-owned communication systems (e.g., key or private branch exchanges (PBX) systems). This ICLID number capability would also be desirable for use in many older private communication systems. Unfortunately, existing adjuncts used with single line telephones cannot be utilized for station sets operating behind these older key or PBX systems.

Thus, there is an identifiable need to provide an ICLID number capability for existing key or PBX systems in a manner which does not require modifications to the existing systems.

2. Summary of the Invention

In accordance with the present invention, an adjunct unit is used with a multi-line communication system to detect information received over incoming lines to the system during the silent interval between ringing signals. The adjunct unit, in response to system control signals received over a station extension line (hereinafter loop), outputs information selected from the detected information over that station loop. According to one feature, the adjunct monitors signaling between the control unit and station sets to determine which station(s) is to receive ICLID information. Another feature uses prestored system database information to convert an ICLID number into a calling party name for output to a station.

BRIEF DESCRIPTION OF THE DRAWING

In the drawing,

FIG. 8 shows a line translation table;

FIG. 10 is a flow chart describing the operation of an ICLID server/monitor used to provide caller names.

DETAILED DESCRIPTION

In the following description, each element of each figure has a reference designation associated therewith, the first number of which refers to the figure in which that element is located (e.g., 100 is located in FIG. 1).

Figure 1:
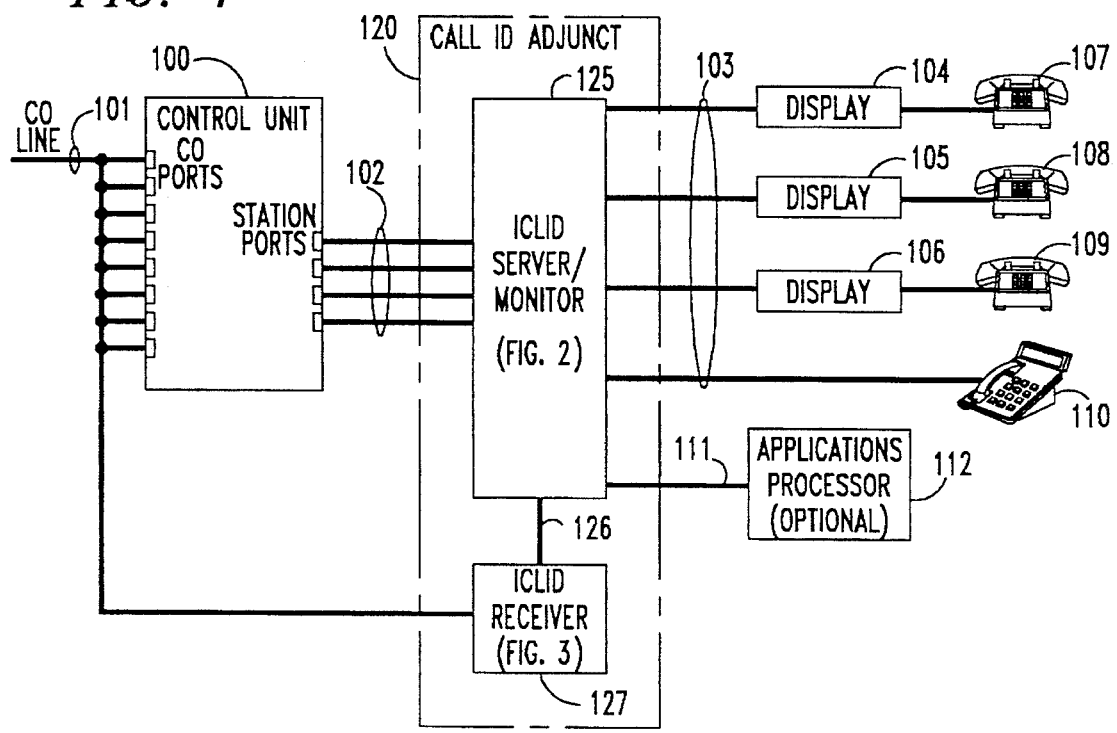
FIG. 1 is a block diagram of the present invention and its connection to an illustrative telephone communication system.

Shown in FIG. 1 is an illustrative block diagram of the present caller ID adjunct arrangement and its connection to an illustrative communication system. The communication system includes common control module 100 which connects to one or more central office (CO) fines or PBX lines with ICLID service 101 and which connects via loops (or station lines) 102 to caller ID adjunct 120. Illustratively, communication system may be a Merlin® communication system such as described in U.S. Pat. No. 4,560,837 issued to Carson et al on Dec. 24, 1985. (Merlin is a registered trademark of AT&T).

Caller ID adjunct 120, illustratively, includes ICLID server/monitor 125 connected via an RS232 facility 126 to ICLID receiver 127. Caller ID adjunct 120 is illustratively shown as both connecting via loops 103 to a plurality of display units 104–106 and associated station sets or terminals 107-109 and connects directly to display station terminal 110. Optionally, caller ID adjunct may connect via facility 111 to an application processor 112.

Briefly, the operation of the caller ID adjunct 120 is as follows. The ICLID numbers for incoming calls (and other central office provided information) received over lines 101 are detected by ICLID receiver 127 which then outputs the ICLID number and CO line number to server/monitor 125. Server/monitor 125 monitors control signals sent over loops 102 which identify which of one or more station terminals 107–110 should receive the ICLID number. The ICLID number is then encoded onto the dc power which is sent to the identified one or more identified station terminals. The display units 104–106 display the ICLID number for the associated non-display station terminals 107–109 while the display station terminal 110 itself displays the ICLID number. If an optional prestored database of calling party names associated with each ICLID exists, then caller ID adjunct 120 provides the calling party name instead of and/or in addition to the ICLID number.

Figure 3:
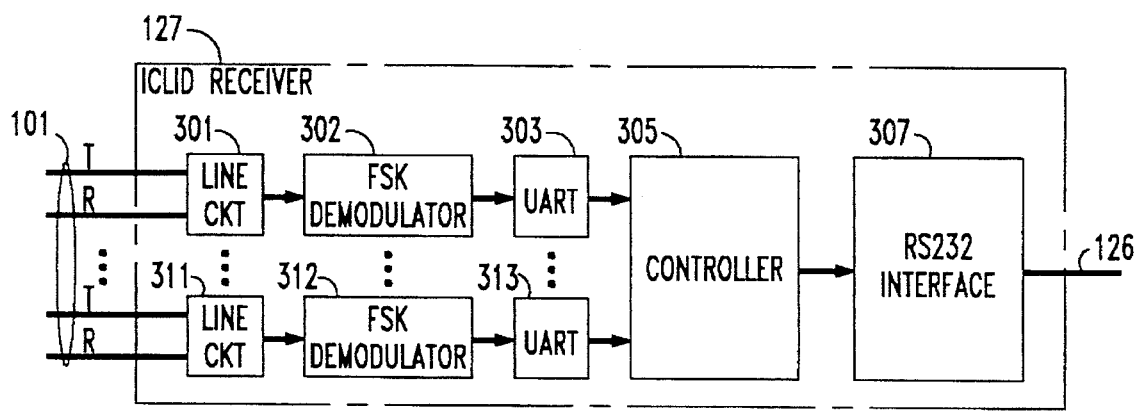
FIG. 3 shows, in block diagram form, an ICLID receiver for receiving special service information during the silent interval between ringing signals from a telephone switching system.
Figure 5:
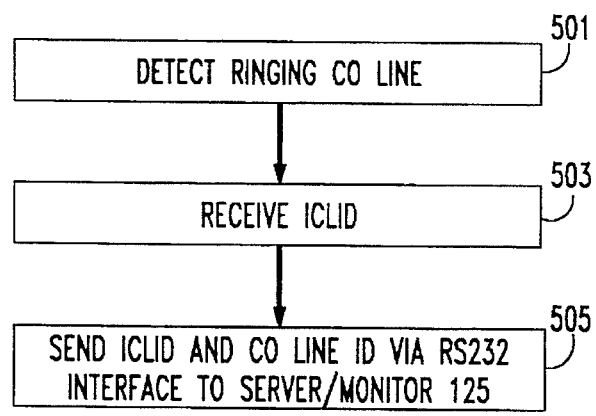
FIG. 5 is a flow chart describing the operation of the ICLID receiver.
Figure 6:
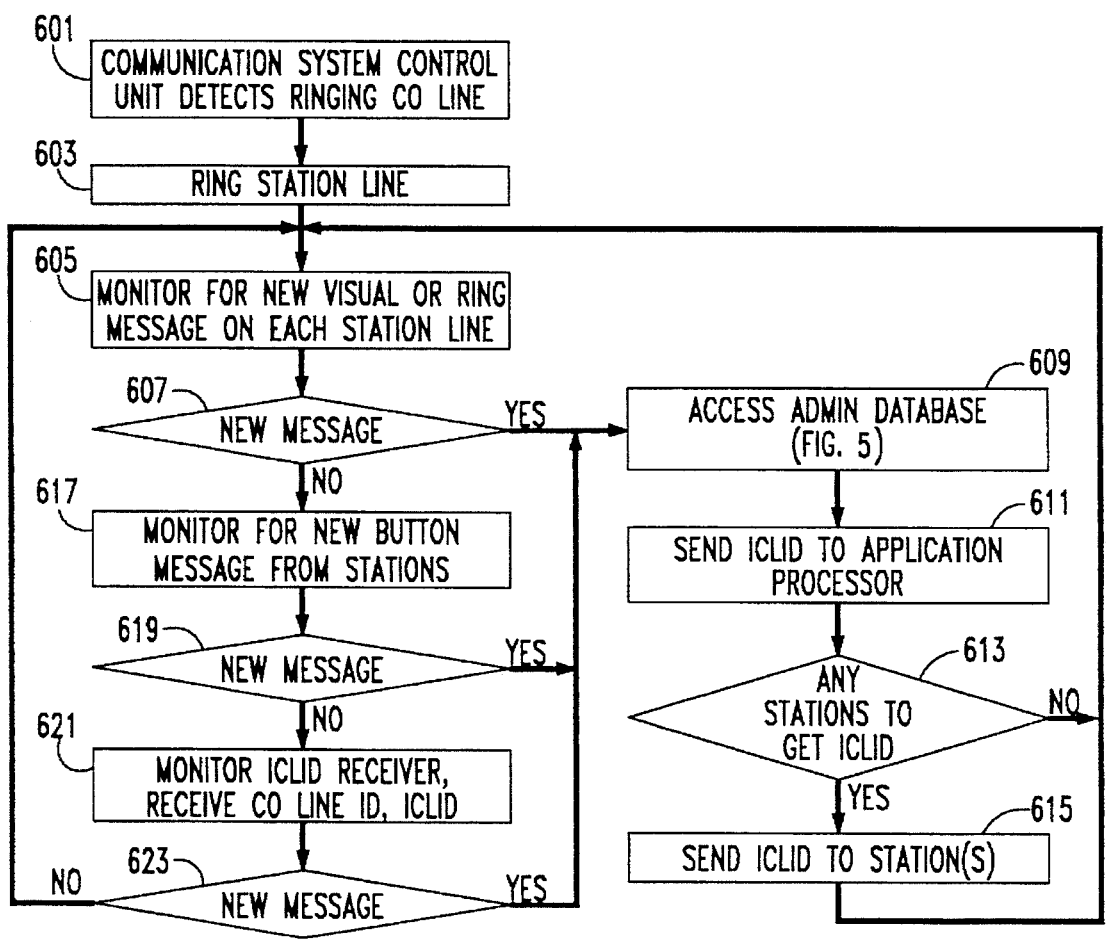
FIG. 6 is a flow chart describing the operation of the ICLID server/monitor.

With joint reference to FIGS. 3 and 5 we describe the operation of the ICLID receiver 127. In step 501, receiver 127 detects a ringing signal over one of the CO lines 101. The well-known CO ringing signal occurs for a time period of approximately two seconds followed by a silent interval of approximately four seconds in duration. In the first silent interval between intermittent ringing signal a frequency shift keyed (FSK) signal is encoded with a data message (e.g., ICLID). This modulated FSK signal is transmitted from the central office in a well-known manner. In step 503, the line circuit 301 receives and amplifies the modulated and unmodulated FSK signal and attenuates the ringing signal. The FSK demodulator 302 converts the modulated FSK signal into a serial bit stream representative of the ICLID data message. Universal asynchronous receiver transmitter (UART) 303 receives the serial ICLID data and converts them to a parallel format for output to controller 305. The line circuit 301, FSK demodulator 302, and UART 303 handle one CO line while other CO lines are handled, respectively, in the same manner, illustratively, by circuits 31 1,312 and 313.

Controller 305 receives the ICLID data and determines over which CO line the information was received. In step 505, controller 305 outputs the CO line and ICLID information to RS232 interface 307 which converts the information to the standard RS232 format for output to ICLID server/monitor 125 over bus 126.

With joint reference to FIGS. 2, 6, 7 and 8 we describe the operation of the ICLID server/monitor 125 of caller ID adjunct 120. In step 601 control unit 100 of the communication system detects ringing on one of CO lines 101 (simultaneously with ICLID receiver 127). For illustrative purposes, we describe the operation only for a single ringing CO line, the caller ID adjunct 120, however, can handle multiple simultaneous CO lines. In step 603, control unit 100 converts the CO ringing signal to a system ringing signal and directs the system ringing signal to one or more station terminals 107–110. Table 800, illustratively located in memory 209, is checked to determine which station terminal has a line appearance associated with the ringing CO line. Alternatively, table 800 could be stored within processor 200.

For example, if CO line 2 was ringing, control unit 100 checks its own translation table (which contains information similar to table 800) to determine if any station has a line appearance associated with CO line 2. Accessing administration table, control unit 100 determines that station 107 has a line 2 assigned to CO line 2 and station 108 has a line 1 assigned to CO line 2 as does station 109. Thus, in response to a ringing CO line 2, control unit 100 sends system ringing signals to station 107, 108 and 109 over line 2, line 1 and line 1, respectively.

Figure 7:
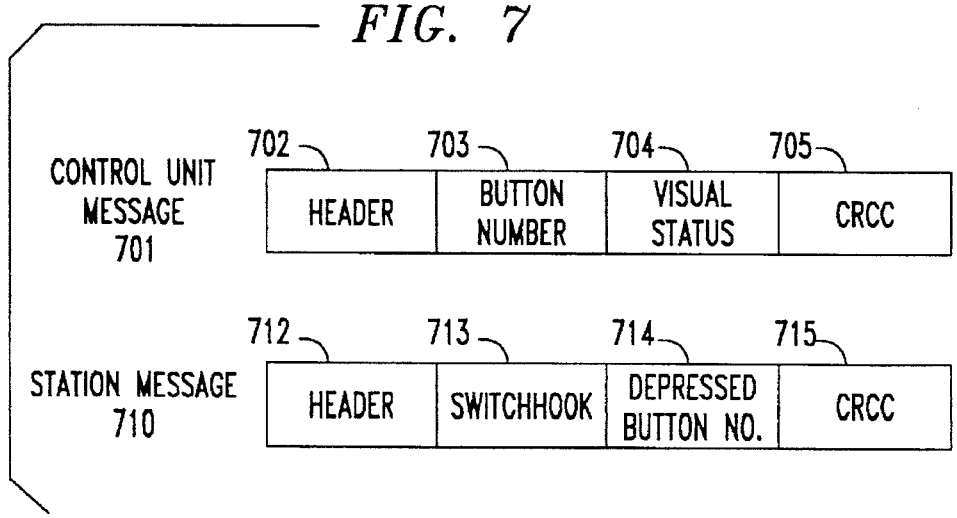
FIG. 7 illustrates the format of messages communicated between the control unit and station terminals.

With reference to FIG. 7 we describe, illustratively, the Merlin system control messages which are sent between control unit 100 and station terminals 107–110. Control unit 100 sends messages to station terminals in the format shown in 701. The control unit transmitted message 701 includes a header 702, button number 703, visual status field 704 and error correcting code 705. Station terminals communicate with control unit 100 using the message format shown in 710. The station transmitted message 710 includes a header 712, a switch hook field 713, a depressed button number field 714 and an error correcting code field 715. The server/monitor 125 monitors the contents of the control unit and station messages to determine, for each station terminal, what the visual indication associated with each station line should be and whether the user has pressed any button or has gone off-hook. Using our Merlin system example, as described in the previously referenced Carson et al patent, when control unit sends a ringing signal to station 107, the visual status field 704 would indicate that the line status "green" LED is in the "flashing" condition and that the line 2 appearance "red" LED associated with CO line 2 would be turned "on". The flashing green LED indicates to the user that the CO line is ringing. When the red LED is turned "on" it indicates that the associated CO line 2 is currently in "use" by the station (not our situation) or that a connection to line CO line 2 will become active when that station goes off-hook (our ringing CO line 2 situation).

In step 605, ICLID server/monitor 125 monitors each control unit message 701 looking for a new visual status message (e.g., a new red LED message) on a station line which is assigned to a ringing CO line. In step 607 it determines if a new LED message exists. If it is a new message, ICLID server/monitor 125 accesses an administration database in step 609.

In accordance with the present invention, in step 607, rather than monitoring for a new visual status message (i.e., the green LED or red LED message), the server/monitor 125 can monitor for the actual ringing signal control message itself (i.e., an audio alerter message) from control unit 100. Similarly, the database would then subsequently be accessed in step 609. Note, if the green LED message or actual ringing signal control message is utilized, some of the below identified features (e.g., preselect feature) may need to be adapted, in a straightforward manner, to perform the same features. The following description assumes that the red LED control message is mentioned by server/monitor 125.

The access of the administration database is used to determine whether or not any station line appearance is associated with the ringing central office line and whether there is a restriction on that line appearance. In our example for a ringing CO line 2, ICLID server/monitor 125 would access table 800 to find a new red LED message for station 107, line 2; station 108, line 1 and station 109, line 1. With reference to table 800, we also see that there is no restriction for line 2 of station 107 or for line 1 of station 109, indicating that they both can receive the ICLID number. Line 1 of station 108, however, has a restriction and so it cannot receive the ICLID number. Note, if no station has a line appearance for a ringing central office line then no station receives the ICLID number.

In step 611, if an optional applications processor 112 is connected to caller ID adjunct 120 then it would receive the ICLID number and store it appropriately with its call records. In step 613, ICLID server/monitor 125 determines whether any of the station terminals 107 through 110 is to receive the ICLID number. If the answer is no, control returns to step 605. If the answer is yes, in step 615, the ICLID number is sent to those stations that do not have a restriction associated with that central office line that is ringing. Thus, in our CO line 2 ringing example, line 2 of station 107 would receive the ICLID information as would line 1 of station 109. However, line 1 of station 108 would not receive the ICLID number. Optionally, if other information was received along with the ICLID number, the server/monitor 125 may select which portion of the information should be sent to the stations. A user at a station which could have answered the call, but didn't, could determine the ICLID number of the caller by preselecting, i.e., by depressing, the line button associated with the active station line (ringing line, held call, answered call), while on-hook. Note if the communication system has a ringing line preference feature and the user at a station terminal selects one or more CO lines to ring at that station terminal, then the ICLID number will be displayed. However, if the user does not select a particular line to ring then the ICLID number will not be displayed when that line is ringing. The user, however, could then preselect that line to obtain the ICLID number as previously described. Moreover, if a call has been placed on hold, a user can determine the ICLID number by preselecting the held line.

In accordance with the present invention, the ICLID number is displayed whenever a station terminal is ringing. Thus, if a station terminal has a delayed ringing feature activated the ICLID number appears after the delay. Additionally, if a call forward feature is activated the ICLID number would also follow the ringing signal. If a call is transferred the ICLID number would be displayed at the transfer station terminal. These features are possible because the present invention detects the new red LED messages in step 605 associated with the delayed ringing, call forward, call transfer or other call processing features that utilize the red LED visual display.

After any of the stations 107 or 109 answer a call by going off-hook, then the ICLID number would be cleared from the display. Alternatively, the ICLID number may be cleared when the call is terminated.

Returning to step 607, if no new red message was determined, then control proceeds to step 617. In step 617, ICLID server/monitor 125 would monitor station messages 710 looking for a new button message from any of the stations 107–110. The new button message would be determined by monitoring the depressed button number field 714. In step 617 the server/monitor 125 checks if the user activated the preselect feature. The preselect feature is activated when a user depresses a button while the station is in the on-hook condition.

As previously noted, the preselect feature enables a user to determine the ICLID of an active call which has an appearance at his or her station terminal by remaining on-hook and by pressing the station line button associated with the active line. For the Merlin system it would be the line button next to the active line visual indicator (i.e., the red LED). In this manner a user can determine using the display ICLID number whether or not to pick-up and enter the conversation.

If the call had been placed on hold the ICLID number is stored in memory 209 and returned to any station that can access the hold line when a user preselects the station line button, in step 617, associated with the hold line.

In step 619 the server/monitor 125 determines whether it has received a new button message from a station set. If the answer is yes, control returns to previously described step 609. If the answer is no, then the server/monitor 125, in step 621, checks ICLID receiver 127 for a new CO ringing line identification and collects the ICLID number associated therewith. This CO line identification and associated ICLID number is stored by server/monitor 125 for use in steps 611 and 615. In step 623, server/monitor 125 determines if there was a new message. If the answer is yes, control returns to step 609. If the answer is no, control returns to step 605.

Figure 2:
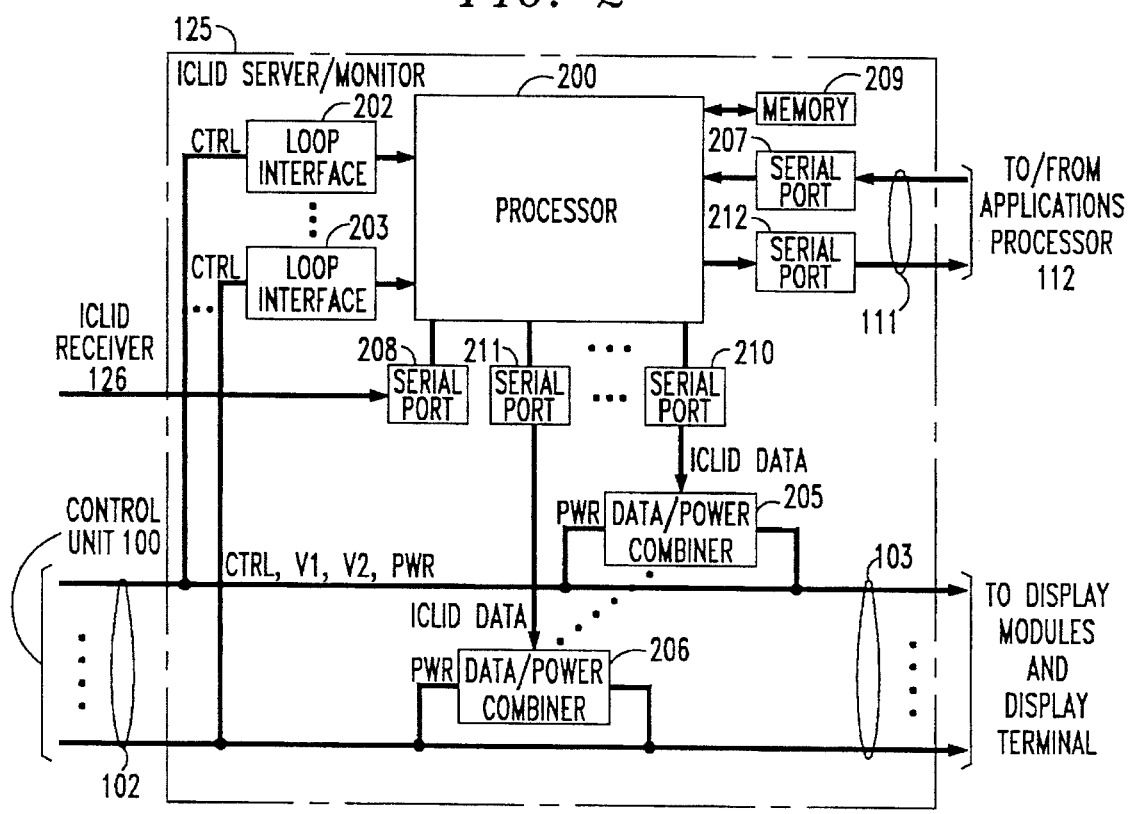
FIG. 2 is a block diagram of the ICLID server/monitor of the present invention.

With reference to FIG. 2 we describe a block diagram of the circuits associated with ICLID server/monitor 125. Server/monitor 125 is controlled by processor 200 using programs stored in program and data memory 209. Each of the station lines in cables 102 and 103 include a control (CTRL) pair for sending control signals between the control unit and station terminals, power (PWR) pair for sending power to the station terminals, and two voice (V1, V2) pairs for communicating voice signals between the control unit and station terminals. Each of the loop interfaces 202 through 203 interface to a different control pair of one of the station lines 102. The CRTL, voice 1 and voice 2 pairs of the station line pass through the server/monitor 125 to display modules 104 through 106 and display terminal 110. The power (PWR) pair of each station line connects to data/power combiner 205. The RS232 line 126 connects via serial port 208 to processor 200. Another serial port 207 inputs signals to processor 200 from applications processor 112. Serial port 212 provides an output to applications processor 112. Serial ports 210–211 provide ICLID data, respectively, to data/power combiners 205–206. Data/power combiner e.g., 205, digitally encodes the ICLID data on the DC power voltage on the power pair. This digitally encoded power signal is then outputted to a display module. As is shown in FIG. 2, a separate serial port and data/power combiner is associated with each power pair of each station line. Thus, in our example, four serial ports (210–211 211), and data power combiners (205–206) are utilized for the three display units 104, 105 and 106 and for display station terminal 110.

Figure 4:
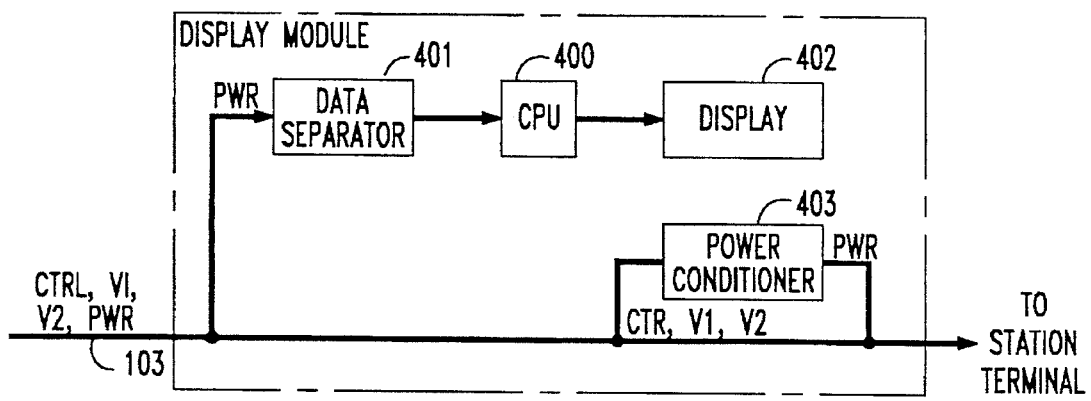
FIG. 4 is a block diagram of a display unit for use with a non-display station terminal of the communication system.

With reference to FIG. 4, we describe the operation of a display module (e.g., 104). A display module receives the control, voice 1, voice 2 and power pairs that comprise a station line. A data separator unit 401 strips the encoded ICLID data signal from the DC power voltage on the power pair. This ICLID data is sent to CPU 400 for processing in a format compatible with display unit 402. A power conditioner 403 provides power for the display module 104 and, also, prevents the ICLID digital signals from proceeding to the station terminal 107 connected to the display module. Note that station terminal 110 includes its own incorporated display module. If a display terminal 110 is utilized which requires a display command which is sent as pan of visual status field 704, then a display interface (not shown) is required to decode the ICLID data from the power pair and insert it in the visual status field. Such a display would be a straightforward enhancement of the present invention.

Figure 9:
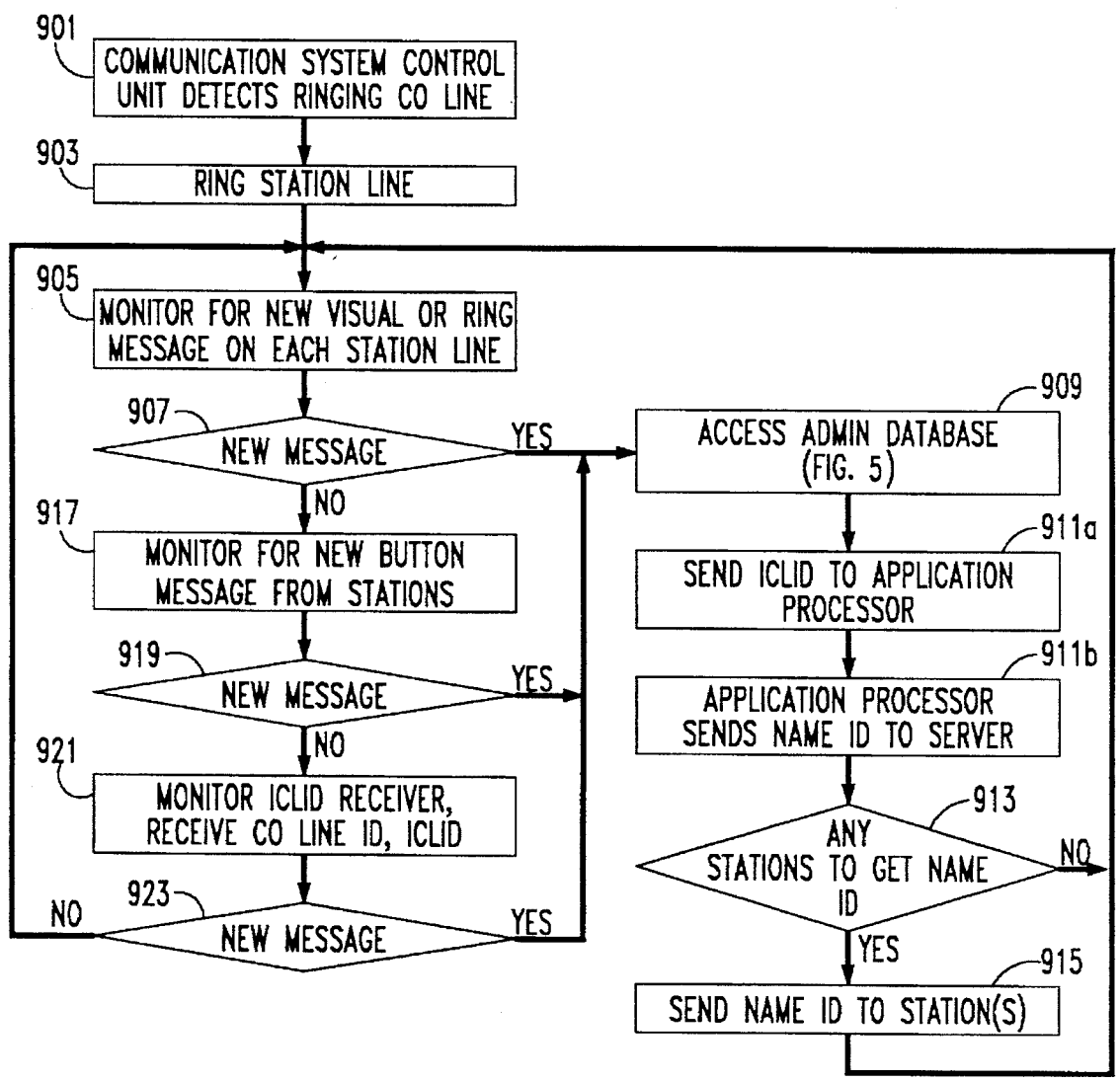
FIG. 9 shows an ICLID to caller name table.

With reference to FIGS. 9 and 10 we describe another feature of the present invention. The flow chart of FIG. 9 and table 100 enables caller ID adjunct 120 to provide a name associated with each ICLID number. In FIG. 9, the steps 901, 903, 905, 907, 909, 917, 919, 921 and 923 function in the same manner as the associated steps of FIG. 6, In step 911*a*, the ICLID associated with a ringing CO line is sent to application processor 112. In step 911*b*, application processor 112 accesses table 1000 to obtain the caller's name associated with the ICLID. For example, if the ICLID was 957–3527 then the application processor 112 would return the name Tom Kurien to the server/monitor 125. In step 913, as previously described with reference to step 613, server/monitor 125 determines if any stations are to receive the name associated with the ICLID number. If the answer is yes, then in step 915 the name identity associated with the ICLID is outputted to the appropriate station(s).

While the present invention has been described to provide ICLID data to display units or display station terminal connected to station lines, as previously noted, other information which is provided during the silent ringing interval could also be selectively provide to the station lines. For example, time-of-day or call connect time may be provided along with ICLID data during the silent ringing interval. Such information may be provided to the station lines or to the application processor for call accounting purposes.

While the present invention has been described for use with a particular type of communication system, it should be understood that it can be adapted to other types of communication systems to provide ICLID features therewith in a straight forward manner consistent with the teachings of the present invention. Thus, what has been described is merely illustrative of the application of the principles of the present invention. Other arrangements and methods can be implemented by those skilled in the art without departing from the spirit and scope of the present invention.

We claim:

1. An adjunct for use with a private communication system which controls communications between a plurality of analog incoming lines and station loops connected to the system, said adjunct interposed between said analog incoming lines and said station loops, said adjunct comprising means for detecting information in an interval between analog ringing signals of an incoming call received over a line of said plurality of analog incoming lines while that line is in an on-hook condition and server means, responsive to a system control signal received over a station loop, for outputting information selected from said detected information, said selected information being outputted over at least said station loop.

2. The adjunct of claim 1 wherein said server means encodes said selected information onto a power signal outputted over at least said station loop.

3. The adjunct of claim 1 wherein said system control signal is a station ring signal outputted over said station loop by said system.

4. The adjunct of claim 1 wherein said system control signal is a visual line status signal outputted over said station loop by said system.

5. The adjunct of claim 1 wherein said system control signal is a button message signal transmitted from apparatus connected to said station loop.

6. The adjunct of claim 1 wherein said server means includes means for storing said detected information and wherein said system control signal is used to select said detected information from said storing means.

7. The adjunct of claim 1 wherein said server means receives said system control signal over a control lead of said station loop and outputs said detected information over a power lead of at least said station loop.

8. The adjunct of claim 1 wherein said detecting means detects an incoming line number associated with said incoming call to said server means and said server means is responsive to said incoming line number for selecting at least said station loop over which to output said selected information.

9. The adjunct of claim 8 further including means for storing as association between at least said station loop and an incoming line number, said storing means also including a restriction data field which indicates whether at least said station loop is prohibited from being outputted said selected information and wherein said server means is responsive to a restriction indication for inhibiting the output of said selected information over at least said station loop.

10. The adjust of claim 1 wherein said detecting means provides an incoming line identification associated with said detected information to said server means.

11. The adjunct of claim 10 wherein said server means is responsive to a system control signal for a line access button of an apparatus connected to said station loop, wherein said server means further includes means for mapping for said station loop an association between said line access button and one of said plurality of analog incoming lines and wherein said server means using said incoming line identification, accesses said mapping means to determine if said line access button is associated with said incoming line information and in response to a positive determination outputs said selected information over at least said station loop.

12. The adjunct of claim 11 wherein said mapping means includes a restriction data field which indicates whether said selected information is not to be outputted over at least said station loop and wherein said server means is responsive to a restriction indication for inhibiting the output of said selected information over at least said station loop.

13. The adjunct of claim 1 further comprising means for accessing an associated database to obtain a calling party name using said detected information and said server means outputting said calling party name over at least said station loop.

14. The adjunct of claim 1, in combination with a display unit connected to at least said station loop for displaying said selected information.

15. The adjunct of claim 13 wherein said server means encodes said selected information onto a power signal outputted over at least said station loop and wherein said display unit decodes said selected information from said power signal for display thereat.

16. A method of operating an adjunct for use with a private communication system which controls communications between a plurality of analog incoming lines and station loops connected to the system, said adjunct interposed between said analog incoming lines and said station loops, said method comprising the steps detecting information in an interval between analog ringing signals of an incoming call received over a line of said plurality of analog incoming lines while that line is in an on-hook condition and in response to a system control signal received over a station loop, outputting information selected from said detected information, said selected information being outputted over at least said station loop.

17. The method of claim 16 wherein said system control signal is a visual line status signal outputted over said station loop.

18. The method of claim 16 wherein said system control signal is a button message signal transmitted from apparatus connected to said station loop.

19. The method of claim 16 wherein said detecting step detects an incoming line number associated with said incoming call and said method further comprising the step of in response to said detected incoming line number, selecting at least said station loop over which to output said selected information.

20. The method of claim 19 including the steps of storing an association between at least said station loop with an incoming line number, and storing a restriction data field which indicates whether at least said station loop is prohibited from being outputted said selected information and wherein in response to a restriction indication, inhibiting the output of said selected information over at least said station loop.

* * * * *

UNITED STATES PATENT AND TRADEMARK OFFICE
CERTIFICATE OF CORRECTION

PATENT NO. : 5,479,493

DATED : December 26, 1995

INVENTOR(S) : Baker et al

It is certified that error appears in the above-identified patent and that said Letters Patent is hereby corrected as shown below:

On the title page, item [75] Inventors: --Mr. Jablonski, Matawan-- should be added after "Richard Y. Hsia, Holmdel"

Signed and Sealed this

Seventeenth Day of September, 1996

*Attest:*

BRUCE LEHMAN

*Attesting Officer*  *Commissioner of Patents and Trademarks*